Figure 6:
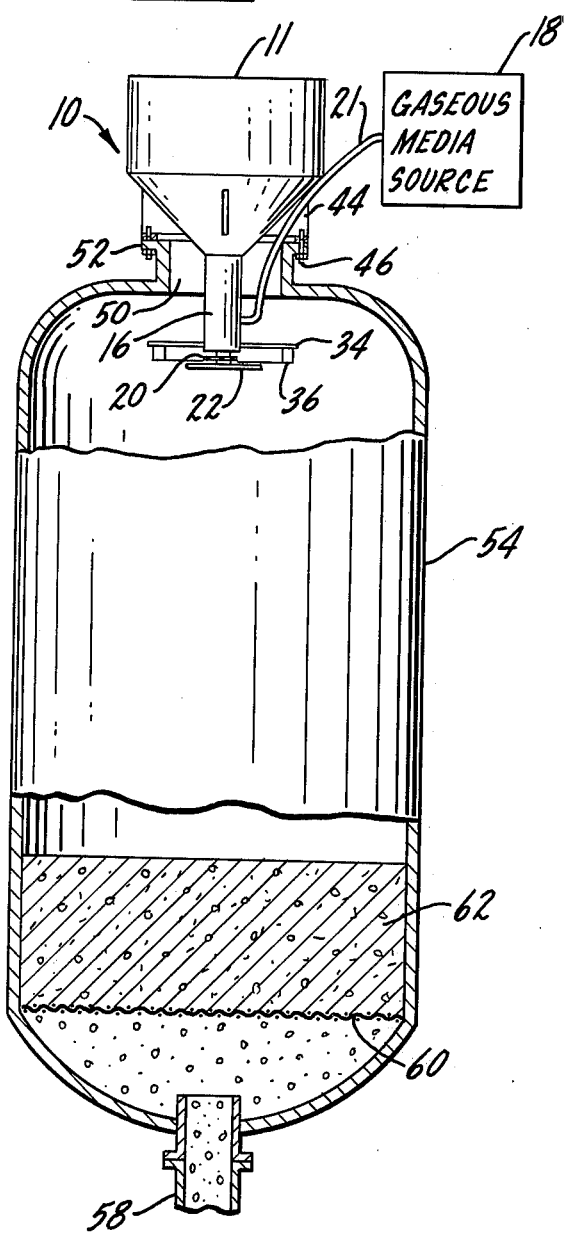

United States Patent [19]
Baillie

[11] 3,949,908
[45] Apr. 13, 1976

[54] APPARATUS AND METHOD FOR DISTRIBUTING PARTICULATE MATERIAL OVER A ZONE

[75] Inventor: Lloyd A. Baillie, Homewood, Ill.

[73] Assignee: Atlantic Richfield Company, Philadelphia, Pa.

[22] Filed: Oct. 25, 1974

[21] Appl. No.: 518,129

[52] U.S. Cl. .................. 222/193; 239/655; 302/61
[51] Int. Cl.² .......................................... B67D 5/24
[58] Field of Search .......... 222/1, 193, 194; 302/59, 302/61; 214/17 C; 239/654, 655

[56] References Cited
UNITED STATES PATENTS

| | | | |
|---|---|---|---|
| 1,813,205 | 7/1931 | Scholz et al. | 214/17 C |
| 2,198,587 | 4/1940 | Skinner | 214/17 C |
| 2,360,756 | 10/1944 | Briggs | 302/61 X |
| 2,684,869 | 7/1954 | Lapple | 302/59 |
| 3,854,637 | 12/1974 | Muller et al. | 222/564 |

Primary Examiner—Stanley H. Tollberg
Assistant Examiner—Hadd Lane
Attorney, Agent, or Firm—Frank J. Uxa

[57] ABSTRACT

An improved apparatus for distributing particulate material, e.g., comprising catalyst particles, over a zone, e.g., chemical reaction zone, comprising:

a supply hopper, having an inlet and an outlet, for holding particulate material;

a deflection plate located adajcent to the end of the outlet away from said supply hopper to deflect the direction of at least a portion of the particulate material flowing through the outlet; and at least one conduit in fluid communication with at least one source of gaseous media, the conduit being situated such that at least a portion of the gaseous media from the conduit flow in the space between the end of the outlet away from the supply hopper and the deflection plate to thereby cause at least a portion of the particulate material to be propelled in substantially the same direction as the flow.

An improved method for placing particulate material in a zone has also been discovered.

15 Claims, 6 Drawing Figures

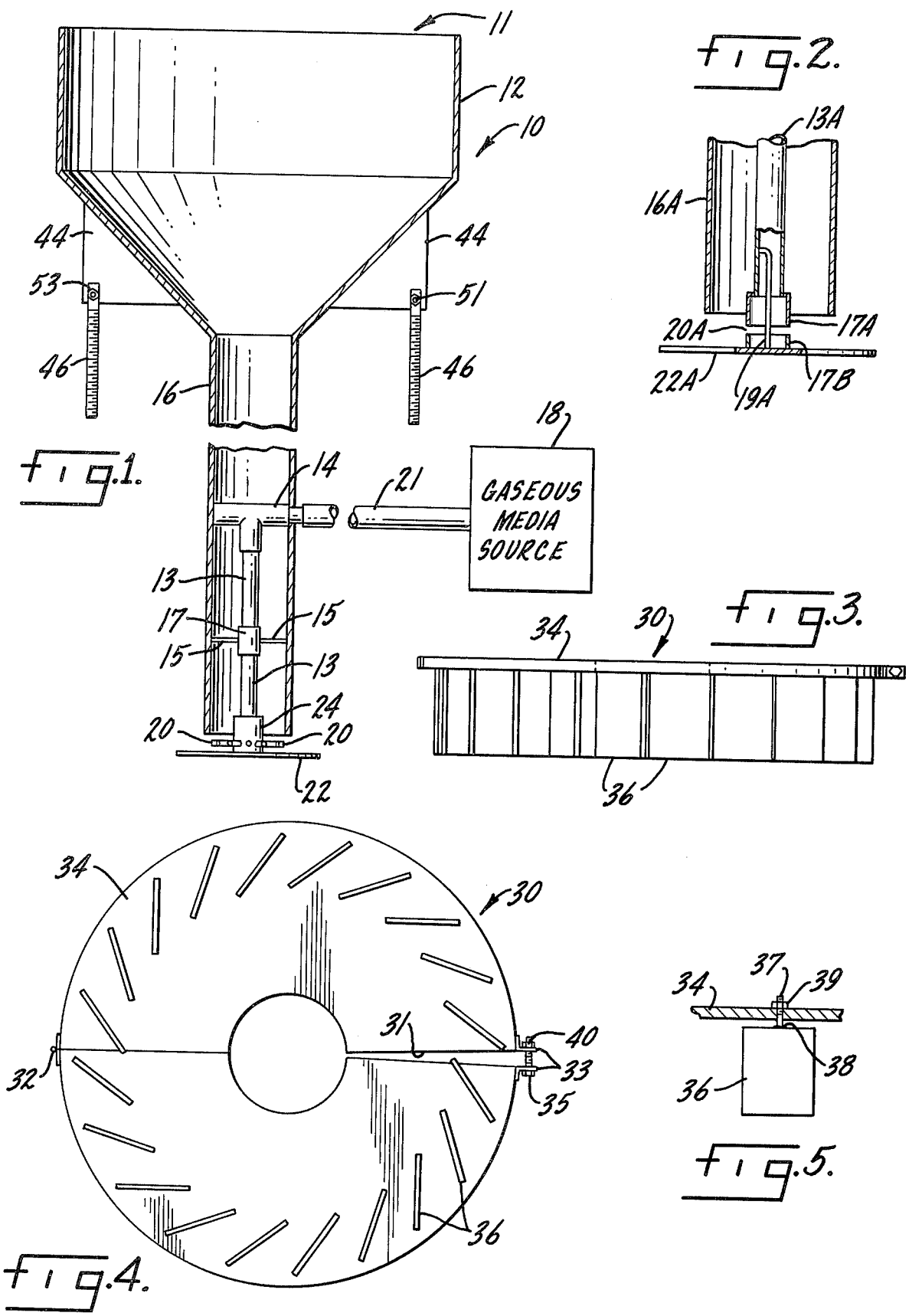

APPARATUS AND METHOD FOR DISTRIBUTING PARTICULATE MATERIAL OVER A ZONE

The present invention relates to an improved particulate distributor. More particularly, the present invention relates to an improved apparatus and method for distributing solid particulate material, such as a catalyst, over a zone, such as a catalytic reactor.

Many instances, for example, throughout the process industries, require that solid particulate material be placed in a confined zone. For example, in the petroleum and chemical process industries, solid particulate catalyst is often placed in a confined chemical reaction zone in order to promote desired chemical reactions. It is desirable that the particulate material be distributed over the zone in a substantially uniform fashion. Therefore, it would be advantageous to develop an improved apparatus and method for distributing particulate material over a zone.

One problem which is commonly encountered in distributing particulate material over a zone is that the inlet through which particulate material is to be introduced into the zone is relatively small and/or is difficult to reach, especially with complex distribution apparatus. Therefore, it would be advantageous to develop a relatively small and simple apparatus for distributing solid particulate material over a zone.

Therefore, one of the objects of the present invention is to provide an apparatus for distributing particulate material, e.g., catalyst, over a zone, e.g., chemical reaction zone.

Another object of the present invention is to provide an improved method for distributing solid particulate material over a zone. Other objects and advantages of the present invention will become apparent hereinafter.

An improved apparatus for distributing solid particulate material over a zone has now been found. In accordance with the present invention, the distribution apparatus comprises a supply hopper, having an inlet and an outlet, for holding solid particulate material; a deflection plate located adjacent to the end of the outlet means away from the supply hopper to deflect the direction of at least a portion of the particulate material flowing through the outlet means; and at least one conduit in fluid communication with at least one source of gaseous media, the conduit being situated such that at least a portion of the gaseous media from the conduits flows in the space between the end of the outlet means away from the supply hopper and the deflection plate to thereby cause at least a portion of the particulate material to be propelled in substantially the same direction as the flow of gaseous media.

It is preferred that the deflection plate of the present apparatus have a configuration which can be substantially aligned with the configuration of the supply hopper outlet means. Although both the deflection plate and outlet means may have any configuration, more preferably both the deflection plate and supply hopper outlet means are substantially circular in cross-section. Also, it is preferred that the deflection plate be larger in size that the cross-section of the outlet means. The cross-sectional area of the termination of the outlet means depends, for example, on the size of the particulate material to be distributed and the flow rate of particulate material desired in the outlet means. In a preferred embodiment, the termination of the outlet means has a cross-sectional area of at least about 20 in.$^2$, more preferably at least about 30 in.$^2$, and the deflector plate has a cross-sectional area of at least about 40 in.$^2$, more preferably at least about 50 in.$^2$.

The deflection plate is preferably situated relative to the termination of the outlet means so that particulate material flows freely from the outlet means when gaseous media flows through the conduits and essentially stops when this gas flow stops. The distances between the termination of the outlet means and the deflection plate depends, for example, on the size of the particulate material being distributed. Preferably, this distance is at least about 0.5 in., and more preferably at least about 0.75 in.

The present apparatus is useful in distributing any solid particulate material over a zone and it is particularly adapted to distributing solid catalyst particles into or over a reactor, e.g., chemical reaction zone. In certain instances, one structure, e.g., reactor, may include two or more zones over which solid particulate material, e.g., catalyst is to be distributed. This situation may result from, for example, internal partition of the space within the structure into distinct zones, or the presence of internal hardware which form obstructions, and thus, restrict the solid particulate material from being distributed over the entire cross-section of the structure from a single point. In these instances, the position of the present apparatus can be adjusted or more than one of such apparatus can be employed to provide substantially uniform distribution of solid particulate material over each of the zones included in the structure.

The gaseous media referred to above may be any substantially inert gaseous material, i.e., gaseous material which does not substantially harm either the distribution apparatus or the particulate material being distributed. Examples of such materials include the inert gases, i.e., helium, neon, argon and the like, nitrogen, mixtures of nitrogen and oxygen, hydrogen and mixtures thereof. Because of availability and convenience, the preferred gaseous media is air. The flowrate of gaseous media supplied to the conduit(s) may vary over a broad range and any specific flowrate range is not critical to the present invention. The gaseous media flowrate chosen is dependent, for example, on the size of the zone over which the particulate material is to be distributed, the size and number of conduits, the size and weight of the particulate material to be distributed and the like. Preferably, the gaseous media is supplied to the conduit(s) at a flowrate of at least about 1.0 SCF/min., more preferably from about 1.0 SCF/min. to about 100 SCF/min. or more. Standard conditions for measuring gas volumes are 60° F. temperature and one atmosphere pressure. Of course, if the zone over which the particulate material is to be distributed is itself at elevated pressure, the gaseous media is supplied to the conduit(s) at an elevated pressure relative to the pressure in this zone.

The source of the gaseous media can be any means conventionally used to supply gases. For example, a reservoir, e.g., cylinder, of highly compressed gas can be used as the source. Also, a gas compressor can be used. Conventional valving arrangements can be employed to insure that the gaseous media is supplied to the conduits at the proper flowrate.

The present distribution apparatus comprises at least one conduit situated such that at least a portion of the gaseous media flows from the conduits into the space between the termination of the outlet means and the deflection plate. The conduit(s) is preferably situated so that the flow of gaseous media into the space between the outlet means and deflection plate is substantially uniform. For example, if the apparatus comprises two or more conduits, it is preferred that they be substantially evenly spaced so that the gaseous flow into the space between the outlet means and deflection plate is substantially uniform. In a preferred embodiment, the number of conduits ranges from 1 to about 24, more preferably from about 8 to about 16. Although the outlets of the conduits may be situated at any horizontal level, it is preferred that these outlets be at the same horizontal level. Although the dimensions of the conduit outlets is not critical to the present invention, it is preferred that the cross-sectional area of each conduit outlet range from about 0.001 in.$^2$ to about 0.1 in.$^2$, more preferably from about 0.001 in.$^2$ to about 0.01 in.$^2$. Also, it is preferred that each of the conduit outlets in any given distribution apparatus has substantially the same cross-sectional area.

In a further preferred embodiment, the present apparatus further comprises redirection means located in the path through which at least a portion of the particulate material is propelled to redirect such particulate material so that the particulate material is substantially uniformly distributed over the cross-section of the zone.

Various redirection means may be included in the present apparations. Preferably, the location of at least a portion of such redirection means can be altered so that particulate material can be substantially uniformly distributed over zones of widely varying configurations or cross-sections.

The apparatus of the present invention may be fabricated from any suitable material of construction. The material of construction used is dependent on the particular application involved. In many instances, metals and metal alloys, such as iron, carbon steel or stainless steel, copper and the like may be used. Of course, the apparatus should be made of a material or combination of materials which is substantially unaffected by the particulate material and the conditions, e.g., temperature, pressure and the like, at which the apparatus is normally operated. In addition, such material or materials should have an substantial detrimental effect on the particulate material being processed.

These and other aspects and advantages of the present invention are set forth in the following detailed description and claims, particularly when considered in conjunction with the accompanying drawings in which like parts bear like reference numerals. In the drawings:

FIG. 1 is a partially broken sectional elevational view of a particulate distributor in accordance with the present invention.

FIG. 2 is a partially broken sectional elevational view of an alternate embodiment of a portion of the present distribution apparatus.

FIG. 3 is a side elevational view of the redirection means of the present apparatus.

FIG. 4 is a bottom side view of the redirection means shown in FIG. 3.

FIG. 5 is a sectional elevational view of a portion of the redirection means shown in FIGS. 3 and 4.

FIG. 6 is a sectional elevational view illustrating utilization of a particulate distributor in accordance with the present invention to distribute catalyst material within a catalyst reactor.

Particulate distributor 10 depicted in FIG. 1 includes supply hopper 12 which, for example, can be made of a sheet metal and can have a substantially frustoconical shape being larger at the upper end. Supply hopper 12 has inlet means 11 through which particulate material can be loaded. A vertical discharge pipe 16 is formed at the termination of supply hopper 12. The hopper 12 can be made of any desired capacity and can have a removable extension for its sides to increase its capacity. The upper end of the hopper 12 can be a square cross-section or a circular cross-section. The capacity extension for the hopper can be mounted vertically or tangentially.

Gas pipe 13 is located, preferably centrally located, in discharge pipe 16. Gas header 21 provides fluid communication between gaseous media source 18 and gas pipe 13. Gas header 21 can be made of flexible material so that gas pipe 13 and gaseous media source 18 may be removed from each other by relatively long distances, which distances can be varied from time to time. Gas header 21 is connected to gas pipe 13 by means of standard T-fitting 14. Gas pipe 13 is supported within discharge pipe 16 by supports 15 and support adapter 17. Gas pipe 13 provides fluid communication between gaseous media source 18 and conduits 20. Conduits 20 are located in the space between the termination of discharge pipe 16 and deflection pipe 22. Deflection plate 22 is attached, e.g., welded, to gas pipe 13 using adapter 24.

The termination of discharge pipe 16 and deflection plate 22 are both circular in configuration with deflection plate 22 being larger than the termination of discharge pipe 16.

Gaseous media source 18 provides gaseous media at a predetermined flowrate to conduits 20 by means of gas header 21 and gas pipe 13. Gaseous media source 18 may involve a reservoir of highly pressurized inert gas, e.g., air, and a conventional valving arrangement to provide gaseous media at the desired flowrate.

FIG. 2 illustrates an alternate embodiment of the present apparatus which involves one continuous conduit 20A. Gas pipe 13A is centrally located in discharge pipe 16A. The ends of support adapters 17A and 17B are situated relative to each other so as to form conduit 20A. Deflection plate 22A is held securely in place by rod 19A which is attached, e.g., welded, to deflection plate 22A and the inside of gas pipe 13A.

Redirection means, shown generally as 30 in FIG. 3 is adapted to be secured, e.g., clamped to discharge pipe 16. Redirection means 30 comprises plane 34. Secured to plane 34 are a plurality of vanes 36. The position of each vane 36 can be altered relative to plane 34. Redirection means 30 acts to redirect the path of at least a portion of the particulate material which is propelled by the flowing gaseous media so that the particulate material is substantially uniformly distributed over the zone. Hinge 32 is attached, e.g., bolted, onto the side of plane 34 to allow the two halves of plane 34 to be parted so that plane 34 can be fitted around discharge pipe 16. Brackets 33 are attached to each half of plane 34 opposite hinge 32. Once plane 34 is fitted around discharge pipe 16, removable bolt 35 is inserted through holes in each bracket 33. Nut 40 is screwed onto bolt 35 until plane 34 is securely attached or fastened to discharge pipe 16.

FIG. 5 illustrates one embodiment in which the position of the vanes 36 can be adjusted relative to plane 34. Screw 37 is attached to vane 36 by means of weld 38. Screw 37 is then placed through plane 34. The rotational position of vane 36 relative to plane 34 can be adjusted and then set by first loosening and then tightening nut 39.

FIG. 6 illustrates operation of a particulate material distributor to distribute catalyst in a catalytic reactor in accordance with the present invention. Distributor 10 is positioned to discharge catalyst through catalyst inlet 50 in the upper surface 52 of catalytic reactor 54. For this purpose, particulate distributor 10 is provided with a plurality of support flanges 44 each of which may be equipped with a mounting bolt 46 to mount particulate distributor 10 to upper surface 52. Support flanges 44 also can be set directly on upper surface 52 with shims utilized to level hopper 12. As seen in FIG. 1, bolts 46 are connected to flanges 44 by means such as bolts 51 and nuts 53. Catalytic reactor 54 is of a cylindrical configuration, having a catalyst inlet 50 in its upper area. Reactor 54, for example, can include a reactor outlet 58, a support screen 60 to support catalyst material 62 a short distance above the lower surface of the reactor. Consequently, when the reactor 54 is in use, generally downwardly flowing reactant enters through, for example, the catalyst inlet 50, passes through catalyst material 62 and exits reactor 54 through reactor outlet 58 at or near the lower surface of reactor 54.

To charge resistor 54 with catalyst by means of particulate distributor 10, a quantity of the catalyst material is provided to supply hopper 12, and gaseous media source 18 is activated to supply air at a predetermined flowrate to conduits 20. Catalyst flows from supply hopper 12 through discharge pipe 16 out of the bottom of discharge pipe 16 and into the path of the air flowing from conduits 20. Somce of the catalyst is propelled by the air from conduits 20 radially essentially in the direction of such flow and impinges upon one or more vanes 36 of redirection means 30 thereby changing the direction of flight of this catalyst material in a predetermined manner so that the catalyst material is substantially uniformly distributed over the cross-section of reactor 54.

With the apparatus of the present invention, catalyst can be charged generally downwardly in reactor 54. Typically, reactors ranging in size from between about 1 to about 15 feet, preferably from about 3 to about 13 feet in diameter, and from about 5 to about 125 feet, more preferably from about 10 to about 70 feet, in length can be charged by the apparatus of the present invention. The catalyst is preferably charged to the reactor at a rate of fill of the reactor of up to about 17 vertical inches per minute, more preferably from about 1 to about 6 and still more preferably, from about 2 to about 4 inches per minute. The rate of fill of the reactor can be non-uniform, that is, the rate of fill can vary within the above range. It is preferred, however, that the rate of fill be uniform and that after a given rate of fill is established, that this rate of fill be maintained while adding particulate material to the catalyst bed. The catalyst particles are introduced into the reactor at a point such that the distance to the catalyst surface formed as the catalyst particles are introduced through a gaseous medium provides an average free fall distance of catalyst particles of at least about 1 foot, more preferably, an average free fall distance of from about 5 to about 125 feet and still more preferably, from about 10 to about 70 feet. In general, the minimum free fall distance provides for a downward velocity sufficient to orient the catalyst particle along the major axis of the catalyst particle, that is the free fall distance should be sufficient to provide for the catalyst particle to move a slight vertical distance upwardly after contact with the catalyst surface in order to accomplish the orientation. Thus, in general, the catalyst particles fall individually to the catalyst surface as the catalyst bed is formed. The orientation of the catalyst particle produced in this manner provides for the substantially horizontal orientation of the catalyst particles on an average basis in that the most probable orientation of the longitudinal axis of catalyst particles is horizontal. In addition, catalyst particles having a substantially horizontal orientation are defined herein to provide a catalyst surface which has a difference between the highest portion of the catalyst surface and a lowest portion of the catalyst surface which is less than 10 percent of the diameter of the catalyst bed, that is a substantially flat surface more preferably less than 5 percent and still more preferably less than 1 percent.

A wide variety of solid catalysts can be distributed with the apparatus of this invention, for example, oxidation, hydrosulfurization, hydrocracking, cracking, reforming and hydrogenation catalysts. Typical examples of hydrosulfurization catalysts comprise any of the transition metals, metal oxides, metal sulfides, or other metal salts which are known to catalyze hydrodesulfurization, and are not poisoned by hydrogen sulfide or other sulfur compounds. The preferred catalysts comprise the oxides and/or sulfides, as for example, the oxides or sulfides of molybdenum, tungsten, iron, cobalt, nickel, chromium and the like. Vanadium compounds may also be employed in some cases. A particularly active combination consists of a Group VIB metal oxide of sulfide with a Group VIII metal oxide or sulfide. For example, compositions containing both molybdenum oxide and cobalt oxide, molybdenum oxide and nickel oxide, tungsten sulfide and nickel sulfide, and the like may be employed.

A particularly active catalyst consists of the composite known as cobalt molybdate, which actually may be a mixture of cobalt and molybdenum oxides wherein the atomic ratio of Co to Mo may be between about 0.4 and 5.0. This catalyst, or any of the above catalysts may be employed in unsupported form, or alternatively it may be suspended on a suitable adsorbent oxide carrier such as alumina, silica zirconia, thoria, magnesia, titania, bauxite, acid-activated clays, or any combination of such materials.

Typical examples of hydrocracking catalysts are crystalline metallic alumino-silicate zeolite, having a platinum group metal, e.g., platinum or palladium, deposited thereon or composited therewith. These crystalline zeolites are characterized by their highly ordered crystalline structure and uniformly dimensioned pores, and have an alumino-silicate anionic cage structure where alumina and silica tetrahedra are intimately connected to each other so as to provide a large number of active sites, with the uniform pore openings facilitating entry of certain molecular structures. It has been found that crystalline aluminosilicate zeolites, having effective pore diameter of about 6 to 15A units, preferably about 8 to 15A units, when composited with the platinum group metal, and particularly after base exchange to reduce the alkali metal oxide, e.g., $Na_2O$, content of the zeolite to less than about 10 weight percent, are effective hydrocracking catalysts.

Other catalysts are supported hydrogenation catalysts comprising a Group VIII metal in the Periodic Table, such as nickel, cobalt, iron or one of the platinum group metals such as palladium, platinum, iridium, or ruthenium on a suitable support. Generally, it is preferred that an oxide or sulfide of a Group VIII metal (particularly iron, cobalt, or nickel) be present in mixture with an oxide or sulfide or a Group VIB metal (preferably molybdenum or tungsten). Suitable carriers or supports include acidic supports such as silica-alumina, silica-magnesia, and other well-known cracking catalyst bases; the acidic clays; fluorided alumina; and mixtures of inorganic oxides, such as alumina silica, zirconia, and titania, having sufficient acidic properties providing high cracking activity.

In addition, the various metals and metal oxides and sulfides can be utilized on a mixture of support materials. Thus, for example, a zeolite and an alumina can be blended together as a support material in varying proportions which support materials contain various metals deposited thereon.

Typical examples of cracking catalysts are the well-known commercial varieties, e.g., Davison XZ-25, Aerocat Triple S-4, Nalcata KSF, Houdry HZ-1, etc. These catalysts are made up of a silica-alumina-zeolite base in particle sizes usually within a size range of 1/32 to ⅜ inch, suitable 1/16 to ⅛ inch, and containing rare earth metal oxides.

Typical compositions of the catalysts are the following. Davison XZ-25, a product of Davison Chemical Company, is mixed silica-alumina-zeolite cracking catalyst containing about 30–35 weight percent alumina, 18 weight percent zeolite X and about 2 weight percent cerium and 1 weight percent lanthanum. Aerocat Triple S-4, a product of American Cyanamid Company, is a silica-alumina-zeolite cracking catalyst containing about 32 weight percent alumina, 3 weight percent zeolite Y, 0.5 weight percent cerium and 0.1 weight percent lanthanum. Nalcat KSF, a product of Nalco Chemical Co., is a silica-alumina-zeolite, cracking catalyst containing about 31–35 weight percent alumina, 11 percent zeolite X, about 1 percent cerium and 0.3 percent lanthanum.

Preferably supply hopper 12 can hold a substantial quantity of particulate material. Such material frequently comes in supply drums, and preferably supply hopper 12 can hold at least one drum of particulate material. Extensions can be added to the sides of supply hopper 12 to increase its capacity while still permitting ready transport and storage. The use of such extensions is facilitated if the upper end of supply hopper 12 has a square cross-section, rather than a circular cross-section.

As a specific example, a particulate distributor in accordance with the present invention can be provided with supply hopper 12 having at its upper end a square cross-section with each side in the order of 3 feet, and at its lower end a circular cross-section, with a diameter in the order of 6 inches to join discharge pipe 16. The sides of such hopper 12 are inclined at an angle in the order of 30°. Discharge pipe 16 is circular in cross-section and has a diameter on the order of 6 inches, while deflection plate 22 is also circular and has a diameter of about 10 inches. Twelve circular conduits 20 each have a cross-section area of about 0.01 in.$^2$. Deflection plate 22 is located so that the vertical distance between it and the termination of discharge pipe 16 is about 0.75 in. Redirection means 30 similar to that shown in FIGS. 3, 4, 5 and 6, is fitted around discharge pipe 16. Each of the movable vanes 36 of redirection means 30 is about 6 inches by about 4 inches. Gaseous media source 18 is, for example, a cylinder containing air at 1000 psig. pressure. The gaseous media source includes a valving arrangement so that air can be supplied from gaseous media source 18 through gas header 21 and gas pipe 13 to conduits 20 at predetermined constant flowrate, e.g., about 100 SCF/min. Such a particulate distributor can readily distribute over a zone with a radius in the order of about three to nine feet a particulate material such as a macrosize catalyst having a diameter in the range of from about 1/64 inch to about ¼ inch and a length in the range of from about 1/32 inch to about ½ inch. Thus, it is seen that the particulate distributor according to the present invention is capable of providing substantially uniform particulate distribution over a zone. The present apparatus can be easily adapted, e.g., by altering the position of the redirection means, to provide substantially uniform particulate distribution over a zone or zones of essentially any configuration.

While this invention has been described with respect to various specific examples and embodiments, it is to be understood that the invention is not limited thereto and that it can be variously practiced within the scope of the following claims.

The embodiments of the invention in which an exclusive property or privilge is claimed are defined as follows:

1. Apparatus for distributing particulate material over a zone comprising:
   a supply hopper, having inlet means and outlet means, for holding particulate material;
   a deflection plate located adjacent to and below the end of said outlet means away from said supply hopper to deflect the direction of at least a portion of said particulate material flowing through said outlet means, provided that the cross-sectional area of said deflection plate is larger than the cross-sectional area of the end of said outlet means away from said supply hopper and that said deflection plate extends beyond the vertical projection of said outlet means in substantially all directions; and
   a plurality of conduits in fluid communication with at least one source of gaseous media through which gaseous media is caused to flow, said conduits extending into and terminating in the space between said outlet means and said deflection plate to thereby cause at least a portion of said particulate material to be propelled in a plurality of directions beyond said deflection plate.

2. The apparatus of claim 1 which further comprises redirection means located in the path through which at least a portion of said particulate material is propelled to redirect such particulate material so that the particulate material is substantially uniformly distributed over the zone.

3. The apparatus of claim 2 wherein said particulate material comprises catalyst and said zone comprises a chemical reaction zone.

4. The apparatus of claim 2 wherein both said deflection plate and the end of said outlet means away from said supply hopper are substantially aligned and substantially circular in cross-section.

5. The apparatus of claim 4 wherein said particulate material comprises catalyst and said zone comprises a chemical reaction zone.

6. The apparatus of claim 4 comprising from about 4 to about 24 said conduits.

7. The apparatus of claim 6 wherein each said conduit is circular in cross-section.

8. The apparatus of claim 7 wherein each said conduit has the same cross-sectional area.

9. The apparatus of claim 8 wherein each conduit has a cross-sectional area in the range from about 0.001 in.$^2$ to about 0.1 in.$^2$, said gaseous media is air, and the flowrate of gaseous media to said conduits is at least about 1.0 SCF/min.

10. The apparatus of claim 9 wherein said particulate material comprises catalyst and said zone comprises a chemical reaction zone.

11. The apparatus of claim 1 wherein said particulate material comprises catalyst and said zone comprises a chemical reaction zone.

12. In a method for hydrocarbon conversion wherein hydrocarbon is contacted with hydrocarbon conversion catalyst particles in at least one chemical reaction zone to effect desired chemical reaction of said hydrocarbon, the improvement comprising using the apparatus of claim 11 to distribute said catalyst particles over said chemical reaction zone.

13. In a method for hydrocarbon conversion wherein hydrocarbon is contacted with hydrocarbon conversion catalyst particles in at least one chemical reaction zone to effect desired chemical reaction of said hydrocarbon, the improvement comprising using the apparatus of claim 3 to distribute said catalyst particles over said chemical reaction zone.

14. In a method for hydrocarbon conversion wherein hydrocarbon is contacted with hydrocarbon conversion catalyst particles is at least one chemical reaction zone to effect desired chemical reaction of said hydrocarbon, the improvement comprising using the apparatus of claim 5 to distribute said catalyst particles over said chemical reaction zone.

15. In a method for hydrocarbon conversion wherein hydrocarbon is contacted with hydrocarbon conversion catalyst particles in at least one chemical reaction zone to effect desired chemical reaction of said hydrocarbon, the improvement comprising using the apparatus of claim 10 to distribute said catalyst particles over said chemical reaction zone.

* * * * *